No. 751,015. PATENTED FEB. 2, 1904.
L. T. ROBINSON.
ELECTRICAL MEASURING INSTRUMENT.
APPLICATION FILED FEB. 10, 1902.
NO MODEL.
Fig.1.
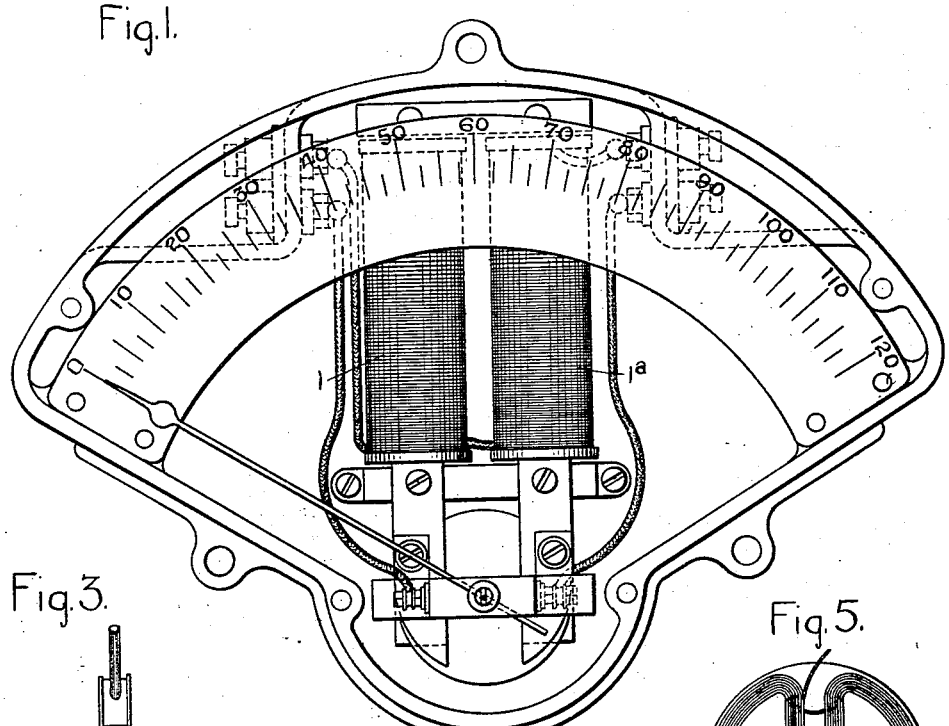
Fig.3.
Fig.5.
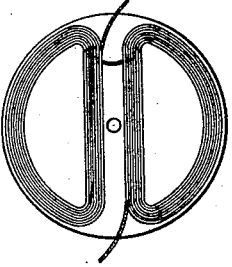
Fig.2.
Fig.4.
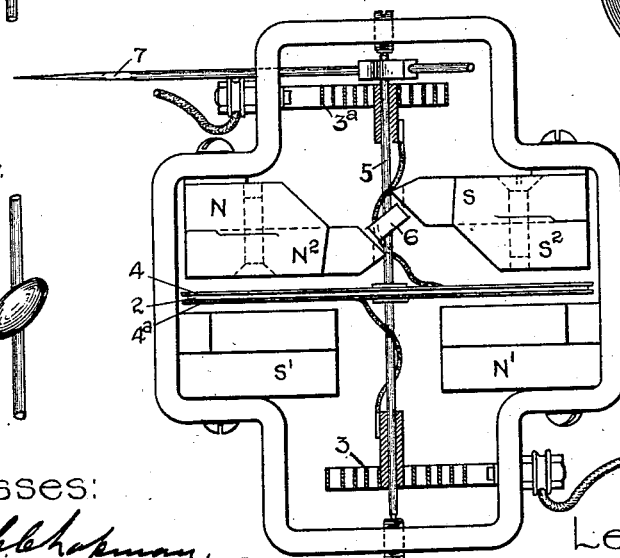
Witnesses:
Robt C. Chapman
Benjamin B. Hull
Inventor:
Lewis T. Robinson.
by Albert G. Davis
Atty.

No. 751,015. Patented February 2, 1904.

UNITED STATES PATENT OFFICE.

LEWIS T. ROBINSON, OF SCHENECTADY, NEW YORK, ASSIGNOR TO GENERAL ELECTRIC COMPANY, A CORPORATION OF NEW YORK.

ELECTRICAL MEASURING INSTRUMENT.

SPECIFICATION forming part of Letters Patent No. 751,015, dated February 2, 1904.

Application filed February 10, 1902. Serial No. 93,304. (No model.)

*To all whom it may concern:*

Be it known that I, LEWIS T. ROBINSON, a citizen of the United States, residing at Schenectady, in the county of Schenectady, State of New York, have invented certain new and useful Improvements in Electrical Measuring Instruments, of which the following is a specification.

Electrical measuring instruments as commonly designed are provided with permanent magnets, made of hardened steel, in the field of force developed by which is mounted a coil carrying the current to be measured. Instruments of this kind are subject to slow changes of strength of the magnetic field, which result in inaccurate indications. Great improvements have been made in the production of permanent magnets in the effort to render them constant in magnetization, but they are nevertheless subject to slow changes, which render recalibration of the instrument necessary after severe usage or long periods of service.

It is one of the objects of my invention to provide an instrument which will be permanent in its indications and which when once calibrated will always give deflections bearing the proper relation to the scale.

Measuring instruments as commonly designed, particularly ammeters, voltmeters, and wattmeters, have a constricted scale less than ninety degrees, and it is one of the objects of my invention to extend the scale over a wider range, thus permitting the scale-indications to be marked at wider intervals and improving the refinement of the indications.

In a copending application, Serial No. 737,566, filed in my name November 20, 1899, and patented as No. 701,937, June 10, 1902, I have described an instrument of the same general character, having the ordinary range of scale, in which the field of force is established by an electromagnet and in which for that reason the torque on the moving element will be much greater than is possible with permanent magnets, and inaccuracy from variation in the electromotive force of the exciting current of the magnet is obviated by the employment of a novel form of counter-torque device, which I employ as a substitute for the spring commonly used. This counter-torque device consists of a small piece of magnetic material mounted in the same field of force, or at least the same magnetic system, as the moving element, but in which the ratio of the counter torque under fluctuations of magnetizing-current relatively to the direct torque is maintained approximately constant in any given position for any value of exciting-current. The best method of effecting this result now known to me is to employ an exceedingly thin layer or film of magnetic material as a counter-torque element, so that it may at all times be saturated by the flux of the field-magnet, and that component of its turning moment due to its own pole strength is therefore independent of moderate changes in that flux. Obviously if the magnetic density is uniform in the return element the changes in the counter torque will vary directly as the changes in magnetic density of the field-magnet itself or the gap in which the return element is mounted and will therefore fluctuate coördinately and coextensively with that factor of the direct torque which depends on the field-magnet of the instrument. Therefore the indications of the instrument must be reliable under all probable conditions of field excitation. It is not, however, absolutely essential that the magnetic material constituting the counter-torque device should be employed in the form of thin films or sheets, strips, or pieces, although I believe that to be the best mode of practicing my invention, since it disturbs less the normal distribution of lines in the field of force, and consequently makes the component due to the field-poles vary alike for the return-piece and for the moving-coil system. It is, however, possible to employ return elements of considerable thickness by forming them of a magnetic material of low permeability, and I elect to cover this particularly in my present application.

In my prior application above referred to I described a system in which the coil-axis was normal to the field of force and in which the return element was at right angles to this axis or parallel to the direction of the flux when the needle was at zero-indication. Under these circumstances the deflection due to the torque of the moving coil was opposed by a counter torque varying approximately as the sine of the angle of deflection. This construction resulted in an effective indicating-scale of about sixty degrees. It is one of the objects of my present invention to increase the range of the scale. I effect this by so mounting the magnetic return-piece with respect to the field of force that it moves through a greater angle than ninety degrees in falling from maximum position of counter torque to zero. This may be effected in various ways. For example, the axis of the moving system may be inclined with reference to the field of force and the magnetic return device inclined with respect to this axis, thus producing an orbital movement of the return-piece in which its magnetic pull varies from zero to maximum over a range of one hundred and eighty degrees. This, however, is not the only way of increasing the range of deflection, though I believe it to be the most practical one.

My invention therefore comprises an electrical measuring instrument provided with a counter-torque device opposing the turning moment applied to the moving-coil system mounted to afford a range of effective operation greater than ninety degrees.

It comprises also a magnetic return device for a measuring instrument mounted for movement in a controlling-field of force on an axis inclined with reference to the flux of said field of force.

It embodies also a magnetic return device for a measuring instrument comprising a piece of magnetizable material having an inferior degree of magnetic permeability.

The novel features will be more particularly hereinafter described and will be definitely indicated in the claims.

In the accompanying drawings, which illustrate the invention, Figure 1 is a front elevation of an instrument embodying my improvements. Fig. 2 is an end view showing the mode of mounting the moving coil and the counter-torque device. Fig. 3 is a detail of the shaft on which the counter-torque device is mounted, showing one type of such device. Fig. 4 shows a counter-torque device formed of a comparatively thick piece of material of inferior magnetic permeability, and Fig. 5 shows the arrangement of the coils on the moving system.

$1\ 1^a$ represent an electromagnet, which may be wound with wire of a suitable gage to fit the instrument for use with any desired source. The coils develop a magnetic flux across a field in which is mounted a movable coil 2, supplied with current from ductile spirals $3\ 3^a$, connecting through suitable binding-posts with leads to a circuit whose current is to be measured. These ductile conductors are wound spirally, as indicated in Fig. 2, but are not in any sense of the word springs, since their effect is in no way relied upon to constitute a counter-torque device for the moving-coil system. The field of force in which the coil moves may be established in any suitable way, according to the style of the instrument, as it forms no particular part of the present invention. In the organization shown the moving coil mounted between two metal disks $4\ 4^a$, which act as a damper, swings in a field of force N S S' N', excited by the electromagnets $1\ 1^a$, two of which may be employed, one above the other, rendering the instrument astatic. The poles N S are provided with extension-pieces $N^2\ S^2$, as shown, one magnet-pole being chamfered and the other extended to direct a flux of magnetism at an angle to the shaft 5 on which the movable coil is mounted, as from $N^2$ to S. In an inclined position with respect to the shaft and mounted thereon is a magnetic return-piece 6, shown in Fig. 2 as set in a position normal to the pole-faces $N^2$ S. This return-piece may be formed in various ways—as, for example, by a block of brass or other non-magnetic metal or material, to the sides of which thin bands of sheet-iron are applied, (see Fig. 3)—or it may be formed of a solid piece of magnetic material of low permeability, as shown in Fig. 4, as by making it of an alloy containing a greater or lesser proportion of iron or nickel and a metal of non-magnetic or poor magnetic quality, in which case it need not be so thin. A pointer 7 is mounted on the shaft, and the latter may be set in jewel-bearings in accordance with the usual practice.

Fig. 3 shows a form of return-piece comprising a central piece of non-magnetic material, to the sides of which thin strips of sheet-iron have been secured, the whole being mounted on the axis of the moving system at an angle, as indicated.

The return-piece shown in Fig. 4 is formed of a homogeneous piece of low permeability with the corners shaped to provide a smooth counter-torque gradient. The coils in the moving system may be set in any suitable position with respect to the pole-pieces, so as to provide a maximum range of movement. The arrangement described extends the counter-torque curve, so that it does not reach a minimum until considerably more than ninety degrees of the scale-plate has been traversed. I have secured excellent results with fairly uniform open readings with a range of indication of one hundred and twenty degrees, as indicated in Fig. 1, and even wider ranges are possible, since the maximum deflection possible would be one hundred and eighty degrees. The range of movement is determined by the maximum range through which the return-piece moves in proceeding from a condition of maximum to that of minimum flux. This, as arranged in the manner described, is not restricted to ninety degrees of index movement, as would be the case were the axis parallel to the pole-faces and the return-piece at right angles to the axis, but is extended by reason of its inclination through a range of one hundred and eighty degrees. Other modes of accomplishing the same result might be employed so long as the distinguishing feature is observed—namely, that the parts shall be so related that the return-piece or counter-torque element in shifting from a position of maximum magnetic flux to a position of minimum magnetic flux will cover an angle greater than ninety degrees resulting in an effective scale-angle exceeding sixty degrees, as in my prior application above referred to.

The present improvements are also applicable to instruments employing permanent magnets furnishing the magnetic field of force rendering the accuracy of indication independent of ordinary variation in the strength of the magnetization. Wherever, however, a source of electric current is available, the electromagnet is more desirable as furnishing a more powerful field of force, insuring high magnetic density, which in the instrument described effects at once more powerful direct and more stable counter torque, thus promoting accuracy irrespective of the age of the instrument or its delicacy of mounting.

What I claim as new, and desire to secure by Letters Patent of the United States, is—

1. An electrical measuring instrument having a magnetic field and a magnetically-operated counter-torque device acting on the moving indicating system, said device being mounted in the field so that the maximum and minimum points of its torque curve cover a greater scale-angle than ninety degrees.

2. An electrical measuring instrument having a magnetic field and a return element mounted therein, the field and element being relatively adjusted to subtend more than ninety degrees between positions of maximum and minimum flux through the return element.

3. An electrical measuring instrument having a magnetic return element furnishing counter torque for the moving indicating system whose path of movement is at an angle to the direction of magnetic flux.

4. An electrical measuring instrument having a magnetic return element furnishing counter torque for the moving indicating system whose path of movement inclines to the direction of magnetic flux.

5. An electrical measuring instrument having a return element formed of a substantial thickness of magnetic material of lower specific permeability than the control-magnet.

6. An electrical measuring instrument having a magnetic return element so mounted as to have a greater magnetic density than the control-magnet and having an orbit inclined to the direction of magnetic flux.

7. An electrical measuring instrument having an electromagnet furnishing its field of force, and a magnetic return device furnishing counter torque moving over a path inclined to the direction of magnetic flux.

8. An electrical measuring instrument having a magnetic return device for furnishing counter torque formed of a metal of inferior magnetic permeability.

9. An electrical measuring instrument having a magnetic return device for furnishing counter torque formed of an alloy of iron.

10. An electrical measuring instrument having a magnetic return device for furnishing counter torque formed of an alloy of iron and a non-magnetic metal.

11. An electrical measuring instrument having a magnetic return device for furnishing counter torque formed of an alloy containing a percentage of magnetic metal.

12. An electrical measuring instrument having a magnetic return device for furnishing counter torque formed of an alloy composed of a magnetic and non-magnetic metal.

In witness whereof I have hereunto set my hand this 4th day of February, 1902.

LEWIS T. ROBINSON.

Witnesses:
BENJAMIN B. HULL,
HELEN ORFORD.